United States Patent [19]

Ritter

[11] 4,373,150
[45] Feb. 8, 1983

[54] MOTOR CONTROL SYSTEM

[75] Inventor: Allen M. Ritter, Rocky Mount, Va.

[73] Assignee: General Electric Company, Salem, Va.

[21] Appl. No.: 309,731

[22] Filed: Oct. 8, 1981

Related U.S. Application Data

[63] Continuation of Ser. No. 104,018, Dec. 17, 1979, abandoned.

[51] Int. Cl.³ .............................................. H02P 5/16
[52] U.S. Cl. .................................. 318/336; 318/317; 318/308; 318/639
[58] Field of Search ............... 318/341, 308, 317, 336, 318/569, 618, 639, 590

[56] References Cited

U.S. PATENT DOCUMENTS

| | | | |
|---|---|---|---|
| 3,593,078 | 7/1971 | Domshy | 318/778 |
| 3,593,083 | 7/1971 | Blaschke | 318/227 |
| 3,732,474 | 5/1973 | Anger et al. | 318/257 |
| 3,883,786 | 5/1975 | McNaughton et al. | 318/317 |
| 4,172,231 | 10/1979 | d'Alayer de Costemore d'Arc et al. | 318/7 |
| 4,201,936 | 5/1980 | Roumanis | 318/341 |

Primary Examiner—David Smith, Jr.
Attorney, Agent, or Firm—Arnold E. Renner; Ormand R. Austin

[57] ABSTRACT

A motor control system including sequencing circuitry for governing the mode of operation of an electric motor in accordance with feedback signals representing selected motor operating parameters further includes modifying circuitry to selectively effect a change in the mode of motor operation in response to an external signal.

14 Claims, 4 Drawing Figures

MOTOR CONTROL SYSTEM

This is a continuation of application Ser. No. 104,018, filed Dec. 17, 1979, now abandoned.

BACKGROUND OF THE INVENTION

The present invention relates generally to motor control systems and more particularly to a motor control system which permits customized modes of operation to satisfy individual needs.

It is well known in the art to provide motor control systems which respond to various motor operating parameters, such as current, voltage and speed, to control the voltage and/or current supplied to the motor and hence control the motor operation. (In the case of alternating current (a.c.) motors, the frequency of the power supplied to the motor is a further known control parameter.) For example, it may be desired, when starting a motor, to first control the voltage supplied to the motor as a function of its terminal voltage and subsequently, after the motor attains a predetermined speed, to control the applied voltage as a function of its actual speed. Similarly, in a jogging operation it may be desirable to control the motor solely as a function of its terminal voltage or the motor current.

These functions of motor control are normally achieved by what is commonly called a sequencing means or sequencer which responds to requesting inputs from an external source, such as an operator panel or input from an automated control system, to select the proper motor operating parameter to be used.

The sequencer itself is customarily comprised of logic means such as fixed logic circuitry or a programmed microprocessor to provide predetermined outputs in response to the requesting inputs. The problem here involved is that if a deviation from the normal sequencer operation is desired in order to meet some special or customized need, the sequencer must be physically modified. For example, if fixed logic circuitry is employed, the circuitry must be rewired. If a microprocessor is used and, as is common, the sequencing logic is found in a programmable read only memory (PROM) then the PROM must be replaced. This, obviously, results in greater expense since there is a deviation from the "standard" and it also does not allow for readily changing the overall system of operation.

SUMMARY OF THE INVENTION

It is, therefore, an object of the present invention to provide an improved motor control system.

It is a further object to provide a motor control system which provides for greater versatility in the use of operational control modes.

Still another object is to provide, in a motor control system, a sequencing means which permits ease in modifications of effective control parameters.

A still further object is to provide, in a motor control system, a sequencing means which allows easy modification of the utilized operational control mode of the motor.

Another object is to provide a modifying means for a motor control system sequencer to thereby facilitate changing of motor operation mode.

The foregoing and other objects are achieved in accordance with the present invention by providing a motor control system of the type which includes a plurality of feedback control loops each of which is representative of an individual motor operating parameter. These feedbacks are selectively utilized to control motor operation in accordance with a desired type of operation. The system includes a sequencing means which is responsive to external inputs denoting the desired type of motor operation for selecting which of said plurality of feedback control loops is operative in accordance with a predetermined logic pattern. There is further included modifying means, which can be an actual part of the sequencing means, which is selectively effective with respect to said sequencing means for modifying said predetermined logic pattern to a modified logic pattern whereby the sequencer as a whole in the effective absence of a modifying means operates in accordance with the predetermined logic pattern and operates in the effective presence of the modifying means to operate in a modified logic pattern.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
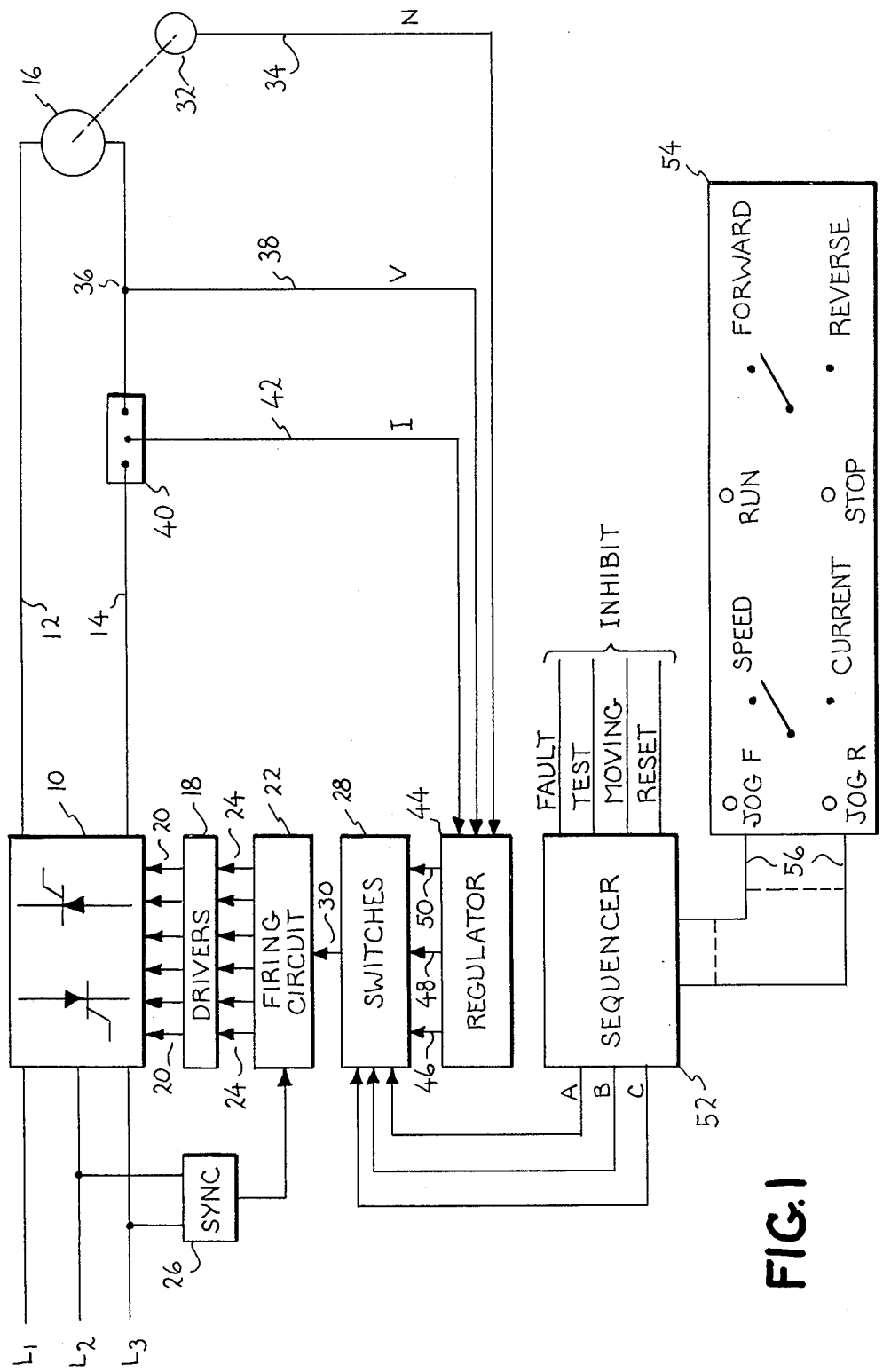
FIG. 1 is a schematic block diagram illustrating a typical environment for the present invention.

Reference is now made to FIG. 1 which illustrates a typical embodiment for and use of the present invention. In the FIG. 1 depiction, the invention is shown as applied to a d.c. motor, although as will become apparent as this description proceeds, the type of motor and the supply therefor is not of importance since the invention has equal applicability to other forms of systems including a.c. motors. In FIG. 1, a suitable power conversion unit 10 is shown connected to a three phase a.c. source indicated by the lines $L_1$, $L_2$ and $L_3$. Since the system being described is a d.c. motor drive, the supply 10 will normally be a three, six or twelve thyristor phase controlled rectifying bridge which supplies power by way of lines 12 and 14 to a d.c. motor 16. If the motor 16 were an a.c. motor, then typically the power converter 10 would be an inverter and the supply source would be d.c. As is known in the art, continuing with the d.c. example, the gate electrodes of each of the thyristors within the power conversion unit 10 are supplied with signals from suitable drivers 18 by way of lines 20. Six such lines are shown in FIG. 1 indicating that a six thyristor bridge is being utilized. Drivers 18 are normally nothing more than gated transistors which serve to apply signals of suitable level to the gate electrode of the thyristors to render them conductive.

A firing circuit 22 is provided to provide the firing signals for the drivers 18 by way of lines 24. Typically, firing circuit 22 may be any of those known in the art which phase controls the firing of the individual rectifiers of the power conversion unit 10 in accordance with an applied signal. To further complete the firing circuit illustration, it is seen that the firing circuit is provided with suitable synchronization by way of a synchronizing means 26 connected between lines $L_2$ and $L_3$. This unit would normally serve to detect zero crossings of the source voltage and thus provide synchronization with respect to that voltage. Since there are many well known firing circuits for providing phase control as indicated by block 22, a description of the internal workings of the circuit is not believed necessary. However, as is typical in these circuits, the phase of firing is controlled by the magnitude of an input signal which is shown as being applied to the firing circuit by way of line 30 from a block 28 labeled switches.

In the illustrated embodiment, three feedbacks representing, respectively, three different motor operating parameters are provided. As will be understood, these parameters are intended to be indicative of the type and are typical of those utilized; although other parameters could also be employed. In FIG. 1, the first operating parameter providing a feedback signal is that which is proportional to the speed (N). The N signal is illustrated as being developed by a suitable tachometer 32 connected to the motor 16 such that there is provided at the output of the tachometer 32 on line 34 a signal having a magnitude proportional to the actual speed of the motor. The second feedback parameter signal, V, is that which is proportional to the terminal voltage of the motor and is shown as being supplied by way of line 38 which is connected to terminal 36 of the motor 16. The third parameter is that which is proportional to motor current. In FIG. 1, a shunt 40 connected in line 14 provides, on line 42, a current feedback signal (I).

The three feedback signals I, V and N are all applied to a regulator 44 which, as will be explained in greater detail with respect to FIG. 2, may comprise nothing more than three differential amplifiers each having a respective reference signal applied thereto as well as one of the input signals to provide as outputs, respectively on lines 46, 48 and 50, three signals having magnitudes which are functions, respectively, of voltage, speed and current. These three signals are supplied to the analog switches 28 which further receives three gating signals A, B and C from a sequencer 52.

In the prior art, as in the case of the present invention, the overall function of the sequencer 52 is to provide switching signals on lines A, B and C in accordance with the operating parameter which is to control the motor at any particular time. In its simplest form, the sequencer would be nothing more than a plurality of switches and/or scaling amplifiers which respond to inputs from an operator panel or other source to provide the signals in accordance with the desired operation. As will be explained further with respect to FIG. 2, the sequencer also may be more complex. In any case, in accordance with common practice, the sequencer receives any of a plurality of signals from a suitable operator panel 54 by way of lines 56. Illustrative of a typical operator panel, the panel 54 includes two switches, one for forward and one for reverse operation and one which determines whether the motor is to run on a speed control mode or a current control mode. In addition, there are indicated buttons for run, stop, jog forward and jog reverse. As an alternate to the control panel, the inputs to the sequencer could be applied from some external overall control system such as a computer which looks at the overall system operation to determine the desired motor operational mode. The last depiction in FIG. 1, to complete a typical overall system, is a plurality of input signals to the sequencer which are labeled collectively "inhibit". Four such signals are illustrated as being typical. These are fault, test, moving and reset. These signals would normally be such that they might inhibit or limit operation of the sequencer to prevent or restrict motor operation as, for example, in the case of a fault. As a further example, if the moving signal were up indicating that the motor were running, it may be that the two jog operations would be inhibited.

As a very brief example of how the system of FIG. 1 might operate, assume that in the run condition with the speed/current switch in the neutral position, the motor is to run under the voltage control. As such, when the operator depressed the run button, the sequencer would, assuming the absence of any prohibiting inhibit signal, output a signal on one of its output lines, for example A, to thus enable one of the switches within block 28. The voltage feedback signal via line 38 would be processed by regulator 44 and the result placed on line 46 to be passed by the switches 28 for placement on line 30 to thus control the firing circuit 22 and hence the voltage supplied to the motor 16 by way of the converter 10 to thus control motor operation. Other modes of operation would, of course, employ other feedback parameters.

As earlier indicated, a fixed sequencer such as has been described thus far does not permit the ready change of operational parameters. This ability is, however, achieved in accordance with the present invention a first embodiment of which is illustrated in FIG. 2. Referencing now that figure, shown within the dashed-line box 44 is a typical implementation of the regulator. The three feedback signals V, N and I are applied, respectively, as inputs to three differential amplifiers 60, 62 and 64. The second input to amplifier 60 is designated reference 1 while that to 62 is designated reference 2 and that to 64 is designated reference 3. These three references would be applied from some external source (not shown) but which might be, for example, manually adjustable potentiometers or inputs from an overall system controller. The outputs of the three amplifiers 60, 62 and 64 on lines 46, 48 and 50, respectively, are provided to the switches 28. As earlier indicated, switches 28 may be analog switches as illustrated at 66, 68 and 70. These switches are responsive to gating signals applied to their respective gating terminals 67, 69 and 71 to provide, on line 30, to the firing circuit 22 a signal having a magnitude in accordance with the desired firing of the rectifiers of the bridge 10. The signals applied to the gating terminals of the switches 28 are derived from the sequencer, to be subsequently described, and it is seen that if operation in, for example, the speed mode is required, a signal applied to terminal 69 of the analog switch 68 will serve to pass the signal from line 48 to line 30. Similarly, if control in accordance with the motor current is desired, switch 70 is activated to pass the signal on line 50 and operation in the voltage control mode is achieved by enabling switch 66 to pass the signal on line 46 to line 30.

As earlier indicated, the gating signals for the three switches 28 are developed by the sequencer 52. In FIG. 2, block 52 illustrates what might be considered a typical sequencer of the prior art while that within block 52' illustrates the modifying means of the present invention. The prime notation is utilized to connote that these two circuit portions may be considered as a sequencer and a modifying means or simply a sequencer. In either case, block 52 illustrates one typical example of how a sequencing function might be achieved. In this illustration, the sequencer is designed to provide that when the run button is depressed, assuming that there is no fault condition, the motor will operate in a voltage control mode up to a set speed after which the motor will operate under the control of the speed feedback signal. To this end there are provided two AND gates 72 and 74 each having three input terminals with the fault inhibit signal being provided to an inverting input of each of the gates. Thus, if the fault signal is present both gates will be disabled and no output will be provided. The second input to each of the AND gates 72 and 74 is the run signal. A suitable comparator 76 has the speed signal N applied to one input. The second input to comparator 76 is a reference signal ("REF 4") which is a voltage signal having a magnitude proportional to a designated speed of the motor. The output of comparator 76 is applied to an inverting input of the AND gate 72 and to a noninverting input of gate 74. Assuming now that no fault is present and the run signal is also present, but that the motor is not moving such that the output of comparator 76 is low, gate 72 will be enabled and gate 72 will be disabled such that the A output from gate 72 is present. If it is first assumed that the circuitry shown within block 52' is short circuited (i.e., signal A' equals signal A is all cases), then it is seen that the A signal will be applied to gate 67 of switch 66 to thus provide the voltage control on line 46 to line 30 to control motor operation. Once the motor has achieved sufficient speed such that comparator 76 begins to output a high level signal, gate 72 will be disabled and gate 74 will be enabled to thus provide a signal on line B, the output of AND gate 74, and no output on line A. Again assuming a straight jumper across the block 52', switch 66 will be disabled, switch 68 enabled and the signal on line 30 will now be one proportional to speed.

The modifying means or the modifying portion of the sequencer depending upon how it is viewed is illustrated within the dashed-line block 52'. Only that modifying means associated with one sequencer output is illustrated in detail, it being specifically understood that each of the output lines of the sequencer, regardless of number, would be, normally, similarly equipped. As illustrated in FIG. 2, with respect to the A output line, the modifying means is illustrated in two parts shown within the blocks 80 and 82. This depiction is intended to detect that the modifying means could comprise a plug-in type unit as is demonstrated by the presence of jacks 83. As shown, the modifying means includes, within block 80, an Exclusive NOR gate 84 having as one input the A signal. That is, one input is what might be considered as the normal output of the "state-of-the-art sequencer". An Exclusive NOR gate, as commonly accepted in the art, is one which provides a high level output signal (a binary 1) when its two input signals are of the same binary level and provides a low level or binary 0 output signal when the two inputs are of different binary levels. The second input to NOR gate 84 is the output of a second NOR gate 86 within block 82. The first input to NOR gate 86 is the A signal from gate 72 and the second input is from a terminal 88 which represents some external source such as a manually operated switch or, once again, a signal from an overall operational system. The presence of a high level signal at 88 indicates that a modified version of operation is to be effective. It is seen from this that when the modifying means is present, that is when 80 and 82 are connected together to make the modifying means effective, the output on line A' from NOR gate 84 will follow the state of the input at 88. When unit 82 is disconnected from 80 and it is assumed that a lack of signal applied to the second input of NOR gate 84 is indicative of a high level, then it is seen that the output of Exclusive NOR gate 84 will follow that of the A input signal.

Figure 2:
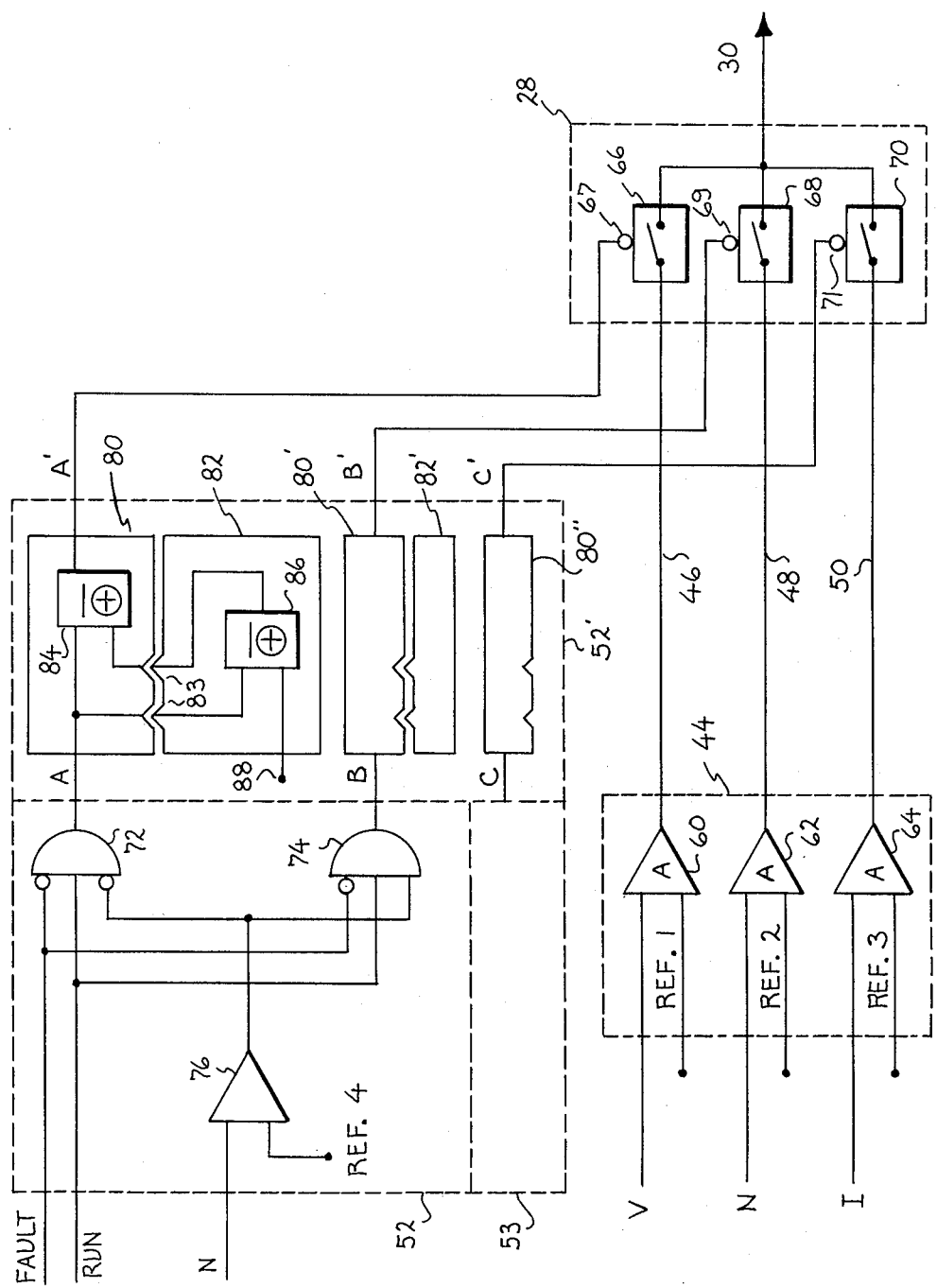
FIG. 2 is a schematic diagram illustrating the present invention in a first embodiment; and, FIG. 3 is a schematic diagram illustrating a modified embodiment of the present invention.

The remaining depictions of FIG. 2 are intended to illustrate that the B line also has the modifying means while the C line (that which emanates from block 53) does not have an associated modifying means. That is, no corresponding block 82" is associated with block 80".

Figure 3:
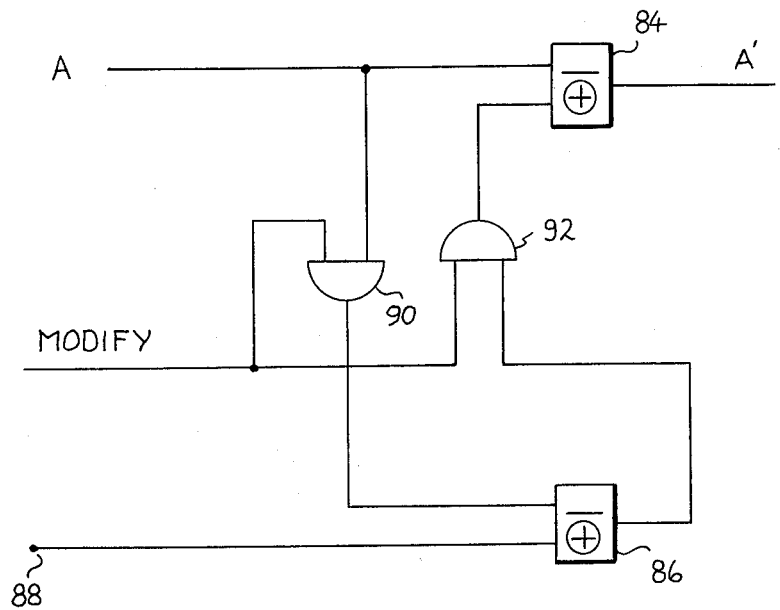

FIG. 3 illustrates another way in which the modifying means could be implemented and one which is preferable in many instances since it does not require the physical connection and disconnection of a unit. In this case, the NOR gates 84 and 86 are again shown and it is seen that two AND gates 90 and 92 are also provided. AND gate 90 is placed between line A and the one input to Exclusive NOR gate 86 while AND gate 92 is provided between the output of NOR gate 86 and the second input to Exclusive NOR gate 84. A signal designated "modify" is applied as a second input to each of the AND gates 90 and 92 and the presence of an enabling modify signal indicates that modified operation is desired. As before, this signal could be the result of a manual operation such as a switch or the result of an input from elsewhere within the overall system. In either case, with the presence of the modifying signal, the sequencer will operate in the modifying mode while in the absence of the signal the sequencer will operate in its normal mode.

Figure 4:
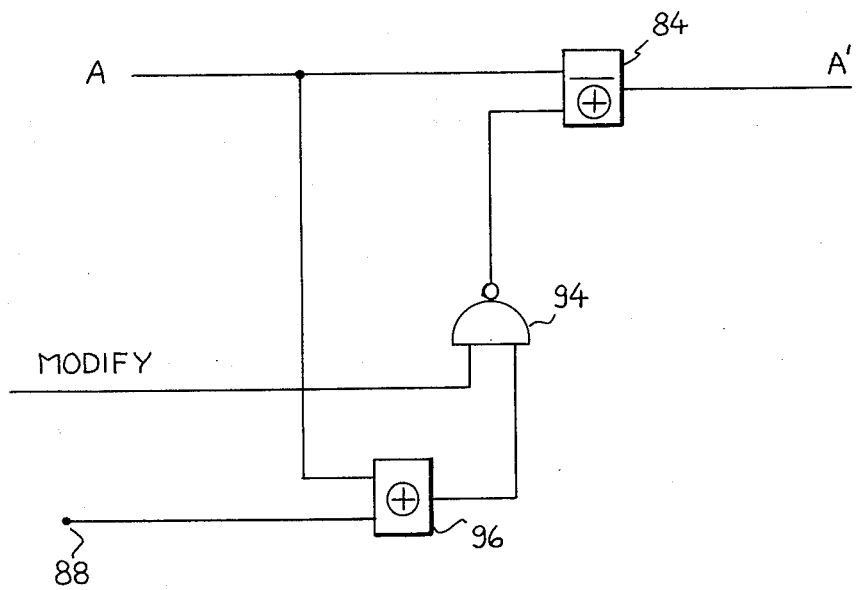
FIG. 4 is a schematic diagram illustrating a further modification of the present invention.

FIG. 4 shows a modification of the FIG. 3 embodiment which may, in certain instances be preferable since less logic circuitry is required. As before, an Exclusive NOR gate 84 is shown having as one input the A signal. The second input to gate 84 is the output of a NAND gate 94 which has as one of its two inputs the "modify" signal. The second input to the NAND gate 94 is the output of an Exclusive OR gate 96 having as its two inputs the A signal and the external signal from terminal 88. (An Exclusive OR gate is one which provides a high level output signal only when a single one of its inputs is at a high level.) It is readily seen that the logic result of the FIG. 4 circuit is the same as that achieved with the two earlier described embodiments.

Thus, it is seen that there has been provided a means for readily and simply providing for modification in a simple and expeditious manner of a normal sequence operation of motor control which modification is readily and inexpensively achieved.

While there have been shown and described what are at present considered to be the preferred embodiments of the present invention, modifications thereto will readily occur to those skilled in the art. For example, other forms of rendering the modifying means effective, such as other logic circuits, could be used with the same end results. It is not desired, therefore, that the invention be limited to the specific circuit shown and described and it is intended to cover in the appended claims all such modifications as fall within the true spirit and scope of the invention.

What is claimed is:

1. A motor control system of the type in which a plurality of feedback control loops, respectively representing different individual types of motor operating parameters, are sequentially utilized to control motor operation in accordance with desired types of motor operation comprising:

(a) sequencing means responsive to external inputs denoting the desired types of motor operation for sequentially selecting which of said plurality of said feedback control loops is operative in accordance with a predetermined logic sequence pattern; and, (b) modifying means selectively connectable to said sequencing means for modifying said predetermined logic sequence pattern to a modified logic sequence pattern whereby in the effective absence of said modifying means said sequencing means operates in said predetermined logic sequence pattern and in the effective presence of said modifying means said sequencing means operates in said modified logic sequence pattern.

2. The invention in accordance with claim 1 wherein said modifying means comprises logic circuitry connectable to a normal output of said sequencing means and responsive to an external signal applied thereto to force the output of said sequencing means to that of said external signal.

3. The invention in accordance with claim 2 wherein said logic circuitry comprises first and second means each providing a logic Exclusive NOR function and wherein said first means is responsive to said normal output of said sequencing means and said external signal to provide an output signal and said second means is responsive to said normal output of said sequencing means and said output of said first means.

4. The invention in accordance with claim 3 wherein said first and second means comprise physically separable units.

5. The invention in accordance with claim 3 wherein said first and second means are connected by logic gating means selectively enabled by an externally applied enabling signal.

6. The invention in accordance with claim 5 wherein said logic gating means comprises first and second AND gates each responsive to said enabling signal to selectively connect and disconnect said first means to and from said second means.

7. The invention in accordance with claim 2 wherein said logic circuitry comprises first logic means for providing a logic Exclusive OR function, second logic means for providing a logic NAND function and third logic means for providing a logic Exclusive NOR function, said first logic means being responsive to said normal output of said sequencing means and said external signal to provide a first output signal, said second logic means being responsive to said first output signal and an externally applied enabling signal to provide a second output signal and said third logic means being responsive to said normal output of said sequencing means and said second output signal.

8. In a motor control system of the type having sequencing means having predetermined logic circuitry responsive to external inputs to sequentially select modes of motor operation in accordance with different ones of a plurality of feedback signals respectively indicative of different various types of motor operating parameters, an improvement in said sequencing means to facilitate a desired modification in the operation of said sequencing means comprising:

(a) means to present said feedback signals to said sequencing means whereby said predetermined logic circuitry provides output signals designating modes of motor operation in accordance with a first prescribed sequence; and, (b) modifying means selectively connectable to said sequencing means to force a change in said sequence and thereby effect a different sequence of modes of motor operation.

9. The invention in accordance with claim 8 wherein said modifying means comprises logic circuitry connectable to a normal output of said sequencing means and responsive to an external signal applied thereto to force the output of said sequencing means to that of said external signal.

10. The invention in accordance with claim 9 wherein said logic circuitry comprises first and second means each providing a logic Exclusive NOR function and wherein said first means is responsive to said normal output of said sequencing means and said external signal to provide an output signal and said second means is responsive to said normal output of said sequencing means and said output of said first means.

11. The invention in accordance with claim 10 wherein said first and second means comprises physically separable units.

12. The invention in accordance with claim 10 wherein said first and second means are connected by logic gating means selectively enabled by an externally applied enabling signal.

13. The invention in accordance with claim 12 wherein said logic gating means comprises first and second AND gates each responsive to said enabling signal to selectively connect and disconnect said first means to and from said second means.

14. The invention in accordance with claim 9 wherein said logic circuitry comprises first logic means for providing a logic Exclusive OR function, second logic means for providing a logic NAND function and third logic means for providing a logic Exclusive NOR function, said first logic means being responsive to said normal output of said sequencing means and said external signal to provide a first output signal, said second logic means being responsive to said first output signal and an externally applied enabling signal to provide a second output signal and said third logic means being responsive to said normal output of said sequencing means and said second output signal.

* * * * *